United States Patent Office 3,043,838
Patented July 10, 1962

---

3,043,838
ISONICOTINOYL HYDRAZONES
Guido Cavallini and Elena Massarani, Milan, Italy, assignors to Francesco Vismara S.p.A., Casatenovo, Como, Italy, a corporation of Italy
No Drawing. Filed Sept. 30, 1960, Ser. No. 59,501
Claims priority, application Great Britain Nov. 27, 1959
9 Claims. (Cl. 260—240)

This invention is concerned with new isonicotinoyl hydrazones having antiviral activity. More particularly it relates to isonicotinoyl hydrazones of biphenylyl glyoxals represented by the following general formulas:

Formula I

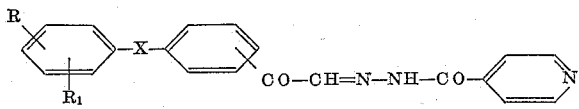

and

Formula II

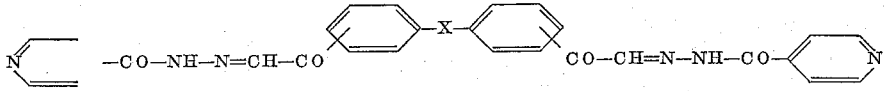

where R represents hydrogen, lower alkyl containing from 1 to 4 carbon atoms, hydroxy, acetoxy or lower alkoxy containing from 1 to 4 carbon atoms; $R_1$ represents hydrogen or halogen such as chlorine, bromine or fluorine; and X represents a direct, single valence bond, oxygen, sulfur, sulfinyl (SO), sulfonyl ($SO_2$), methylene ($CH_2$), ethylene ($CH_2$—$CH_2$) or vinylene (CH=CH). Advantageous compounds of this invention are those in which R is in the 4'-position; $R_1$ is in the 3'-position; and the hydrazino moieties are in the 4,4'-positions. Particularly advantageous compounds of this invention are those in which R is hydrogen, methyl or methoxy, preferably hydrogen; $R_1$ is hydrogen or halogen of atomic weight less than 80, preferably hydrogen or chlorine; and X is a single valence bond.

While isonicotinic acid hydrazide is a known compound having tuberculostatic action, the new isonicotinoyl hydrazones of diphenylyl glyoxals of this invention have antiviral activity. They are useful in the treatment of viral infections and diseases, particularly those involving skin and eyes, such as herpes simplex, herpes zoster, verruca vulgaris and plana, pointed condyloma, molluscum contagiosum, pemphigus, limphogranuloma venereum, aphthosis, milkers' nodules, viral conjunctivitis, and the like.

The isonicotinoyl hydrazones of biphenylyl glyoxals of this invention are prepared by condensing either the anhydrous or hydrate glyoxal with isonicotinic acid hydrazide. More specifically, to prepare the compounds of Formula I approximately equimolecular amounts of reagents are employed and to prepare the compounds of Formula II two moles of isonicotinic acid hydrazide are reacted with one mole of biphenylyl bisglyoxal. The glyoxal starting materials may also be employed in the reaction as an addition product for example a hemiacetal or alcoholate formed from a lower alkanol such as methanol or ethanol.

The condensation reaction is carried out either in an organic solvent of alcoholic type or in an inert one such as ether, benzene, dioxane, tetrahydrofuran and the like. The reaction temperature can vary from about room temperature, i.e., 20–25° C. up to the boiling point of the employed solvent but it is preferably maintained between about 50° C. and about 100° C. The reaction time greatly depends on the chemical nature of the reactants as well as the reaction temperature, but generally about 2–8 hours are required for obtaining optimum yields of the end products. The product is usually isolated as a precipitate which is filtered.

The biphenylyl glyoxal starting materials to prepare the mono and bis hydrazones of Formulas I and II are represented by the following Formulas III and IV, respectively:

Formula III

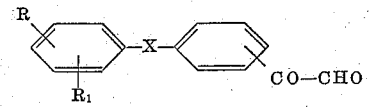

and

Formula IV

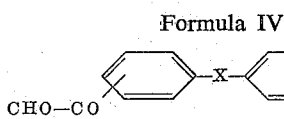

where R, $R_1$ and X are as defined above. These compounds are either known per se or are obtained, for example, by oxidation with selenium dioxide of the corresponding acetyl derivatives which are generally well known or can be easily prepared by reacting a substituted diphenyl derivative with acetyl chloride, under Friedel-Crafts conditions. Further, these glyoxals are obtained from the intermediate dihalogeno acetyl derivatives which are treated with an alkali metal alcoholate such as sodium or potassium methanolate or ethanolate to give the desired glyoxal. The dihalogeno acetyl derivatives are prepared either by a Friedel-Crafts reaction or by halogenation of the acetyl derivative.

The new compounds of this invention can be used advantageously as chemotherapeutic drugs in the treatment of viral infections and diseases, particularly those involving skin and eyes. The experimental assays have shown that isonicotinoyl hydrazones are active at very low doses, often lower than 10 mg./kg. while on the other hand they can be regarded as atoxic, since their toxicity becomes apparent at doses greater than 3000 mg./kg.

The isonicotinoyl hydrazones of the present invention show different advantages. They are very stable under normal acidic or basic conditions, water resistant and they can be stored long without the occurrence of decomposition processes. Moreover on account of their stability they possess a sustained antiviral effect which makes them particularly suitable for topical applications. Another advantage is the absolute lack of irritative effects, even the smallest, on the cutaneous surface.

For these properties the biphenylyl glyoxal isonicotinoyl hydrazones of this invention can be advantageously administered in admixture with a pharmaceutical organic or inorganic solid or liquid carrier material suitable for topical application. For the production of these preparations the active compounds are dissolved or emulsified in a nontoxic solid or liquid carrier such as stearic acid, glycerin, propylene glycol, stearyl alcohol, cetyl alcohol, sodium lauryl sulfate, self-emulsifying glyceryl monostearate, methyl paraben, cholesterol, agar and the like. The carrier or diluent may include also auxiliary substances such as preservatives, stabilising, wetting agents, salts or buffer substances. The pharmaceutical preparations can take the form of salves, creams, ointments with the active substances dissolved or suspended, for example, in microcrystalline or emulsified form. The dose range can vary within the limits mentioned above, namely from 10 mg./kg. to about 3000 mg./kg. and preferably from about 30 to about 500 mg.

In summary, the new isonicotinoyl hydrazones can be given to virus infected organisms by direct application when skin or the conjunctival sac are involved, in order to influence favorably the viral infection.

The following examples are illustrative of the compounds of this invention, but are not to be construed as limiting.

Example 1

A mixture of 2.28 g. (0.01 mole) of biphenylyl-4-glyoxal hydrate, 1.37 g. (0.01 mole) of isonicotinic acid hydrazide and 75 cc. of ethanol is heated at reflux for 2 hours. Cooling separates the isonicotinoyl hydrazone of biphenylyl-4-glyoxal which, filtered and recrystallized from ethanol, melts at 218–220° C. Yield 81%.

Example 2

A mixture of 3.9 g. of $SeO_2$, 15 cc. of aqueous dioxane and 6.5 g. of 4'-methyl-4-acetylbiphenyl (prepared by reacting 4-methylbiphenyl with acetyl chloride under Friedel-Crafts conditions) is heated at reflux for 6 hours, then filtered hot and partially evaporated. Cooling separated the 4'-methyl-biphenylyl-4-glyoxal hydrate (4 g.) which is treated with 1.8 g. of isonicotinic acid hydrazide in propanol at reflux for 4 hours. Cooling separates the 4'-methyl-biphenylyl-4-glyoxal isonicotinoyl hydrazone.

Example 3

A mixture of 2.8 g. of selenium dioxide, 15 cc. of aqueous dioxane and 6 g. of 4'-isopropyl-4-acetylbiphenyl (prepared by reacting 4-isopropyl-biphenyl with acetyl chloride under Friedel-Crafts conditions) is treated as in Example 2 to give the 4'-isopropyl-biphenylyl-4-glyoxal hydrate. This compound (4.2 g.) is heated with 2 g. of isoniazide as in Example 1 to obtain the 4'-isopropyl-biphenylyl-4-glyoxal isonicotinoyl hydrazone.

Example 4

A solution of 12.4 g. of 4-acetyl-4'-tert.-butyl-biphenyl (prepared by the reaction of acetyl chloride with 4 tert.-butylbiphenyl under Friedel-Crafts conditions) is heated with 7.8 g. of selenium dioxide in dioxane at reflux for 5 hours then filtered hot and partially evaporated. Cooling separates 4'-tert.-butylbiphenylyl-4-glyoxal. This compound (5.5 g.) is heated in ethanol with 3 g. of isoniazid for two hours. Cooling separates the 4'-tert.-butylbiphenylyl-4-glyoxal isonicotinoyl hydrazone.

Example 5

A solution of 13.5 g. of 4-acetyl-3'-bromo-biphenyl and 7.75 g. of selenium dioxide in dioxane is heated at reflux for several hours. After filtration, the hot solution is cooled to separate the desired 3'-bromo-biphenylyl-4-glyoxal. This compound (5.4 g.) is reacted with 3 g. of isoniazid in 50 cc. dioxane at reflux for 6 hours. Cooling separates the 3'-bromo-biphenylyl-4-glyoxal isonicotinoyl hydrazone.

Example 6

A mixture of 11.4 g. of 4-acetyl-3'-chloro-4'-methyl-biphenyl (prepared by reacting acetyl chloride with 3-chloro-4-methylbiphenyl under Friedel-Crafts condition) and 7 g. of selenium dioxide in dioxane is heated for several hours at reflux, then filtered hot and partially evaporated. Cooling separates 3'-chloro-4'-methyl-biphenylyl-4-glyoxal. This compound (4.9 g.) is reacted with 2.5 g. of isoniazid in 50 cc. of ethyl alcohol at reflux for 4 hours. Cooling separates the 3'-chloro-4'-methyl-biphenylyl-4-glyoxal isonicotinoyl hydrazone.

Example 7

A mixture of 2.42 g. of 4'-methoxy-4-biphenylyl-glyoxal hydrate, 1.37 g. of isonicotinic acid hydrazide and 75 cc. of ethyl alcohol is refluxed for three hours. Cooling gives 4'-methoxy-4-biphenylylglyoxal isonicotinoyl hydrazone, M.P. 226–227° C.

Example 8

A mixture of 2.77 g. of 4'-methoxy-3'-chloro-4-biphenylylglyoxal hydrate, 1.37 g. of isonicotinic acid hydrazide and 80 cc. of ethyl alcohol is heated at reflux for two hours. Cooling precipitates the isonicotinoyl hydrazone of 4'-methoxy-3'-chloro-4-biphenylylglyoxal, M.P. 232–233° C.

Example 9

4-phenoxyacetophenone (11.2 g.) is dissolved in 100 cc. of glacial acetic acid and chlorine gas is passed into the solution at about 40° C. for about one hour. The mixture is treated with water and extracted successively with methylene chloride. The combined, dried extracts are evaporated to give the residual 4-dichloroacetyl diphenylether, M.P. 67–69° C.

This diphenylether (6.0 g.) is dissolved in anhydrous methanol and treated with a solution of 1.2 g. of sodium in 25 cc. of anhydrous methanol at 45° C. After about two hours the mixture gives a neutral reaction to phenolphthalein, indicating that the reaction is complete. The mixture is filtered and the filtrate evaporated to dryness. The residue is taken up in acetic acid at 50° C. and the solution treated with charcoal. To the solution is added 2.5 cc. of 3% sulfuric acid and then water to precipitate, with cooling the 4-phenoxyphenylglyoxal, hydrate, M.P. 84° C.

A mixture of 2.4 g. of this glyoxal, 1.37 g. of isonicotinic acid hydrazide and 75 cc. of ethanol is refluxed for three hours to give upon cooling 4-phenoxy-penhylglyoxal isonicotinoyl hydrazone, M.P. 182–184° C.

Example 10

A solution of 12.5 g. of 4,4'-diacetyldiphenylether in 100 cc. of glacial acetic acid is chlorinated with anhydrous chlorine gas at 40° C. for one hour. The solution is diluted with water, extracted with chloroform and the dried extract evaporated. The residue is taken up in boiling hexane and cooled to give 4,4'-bis-dichloroacetyl-diphenylether. The diphenylether is dissolved in absolute ethanol and treated with a solution of sodium ethylate, obtained by dissolving 1.2 g. of metallic sodium in 0.5 cc. of ethanol. Working up as in Example 9 yields 4,4'-bisglyoxalyl-diphenylether hydrate, M.P. 147–149° C.

This bisglyoxal (3.0 g.) and 2.5 g. of isonicotinic acid hydrazide in 75 cc. of ethanol is refluxed for four hours and the solution then cooled to give 4,4'-bisglyoxalyl-diphenylether bisisonicotinoyl hydrazone, M.P. 187° C.

Example 11

A mixture of 20.1 g. of 4-methoxydiphenylether, 25 g. of aluminum chloride and 150 cc. of carbon disulfide is treated with 14.7 g. of dichloroacetyl chloride. At the end of the reaction, the mixture is treated with acidified water and ice and then extracted with methylene chloride. The organic extract is washed, dried and evaporated to give 4'-methoxy-4-dichloroacetyl-diphenylether.

The diphenylether thus obtained (6.2 g.) is dissolved in anhydrous methanol and treated dropwise with a solution of 1.2 g. of sodium in 25 cc. of anhydrous methanol at 45° C. After two hours the reaction mixture is worked up as in Example 9 to give 4'-methoxy-4-glyoxalyl-diphenylether hydrate, M.P. 105–106° C.

This diphenylether (2.8 g.) dissolved in 100 cc. of ethanol is refluxed with 1.37 g. of isonicotinic acid hydrazide for two hours. Cooling separates the 4'-methoxy-4-glyoxalyl-diphenylether isonicotinoyl hydrazone.

Example 12

A mixture of 18.7 g. of 4-hydroxydiphenylether, 20 g. of aluminum chloride and 100 cc. of carbon disulfide is treated with 7.8 g. of acetyl chloride. The reaction mixture is worked up as in Example 11 to yield 4'-hydroxy-4-acetyl-diphenylether.

To a mixture of 7.75 g. of selenium dioxide, 2 cc. of water and 20 cc. of dioxane at 70° C. is added dropwise a solution of 11.2 g. of 4'-hydroxy-4-acetyl-diphenylether in 60 cc. of dioxane. The reaction mixture is refluxed for five hours, filtered and partially evaporated. Cooling separates 4'-hydroxy-4-glyoxalyl-diphenylether hydrate, M.P. 121–122° C.

A solution of 2.6 g. of this diphenylether in 80 cc. of ethanol and 1.37 g. of isonicotinic acid hydrazide is refluxed for three hours to give upon cooling the isonicotinoyl hydrazone of 4'-hydroxy-4-glyoxalyl-diphenylether.

Example 13

A mixture of 20.4 g. of 4-chlorodiphenylether, 25 g. of aluminum chloride and 150 cc. of carbon disulfide is reacted with 14.7 g. of dichloroacetyl chloride as described in Example 11 to yield 4'-chloro-4-dichloroacetyl-diphenylether. This intermediate dissolved in absolute ethanol is treated with sodium ethylate to give 4'-chloro-4-glyoxalyl-diphenylether hydrate, M.P. 110–111° C.

This diphenylether (3 g.) is reacted with 1.6 g. of isonicotinic acid hydrazide in 75 cc. of ethanol to give 4'-chloro-4-glyoxalyl-diphenylether isonicotinoyl hydrazone.

Example 14

A solution of 4.5 g. of 4'-acetoxy-4-acetyl-diphenylether, prepared by acetylation of the corresponding 4'-hydroxy derivative, in 50 cc. of glacial acetic acid is chlorinated with gaseous chlorine as in Example 9 to give 4'-acetoxy-4-dichloroacetyl-diphenylether. The latter compound is reacted similarly as in Example 1 with a solution of sodium in methanol to give 4'-acetoxy-4-glyoxalyl-diphenylether hydrate.

This diphenylether (2.96 g.) in 100 cc. of methanol is reached with 1.5 g. of isonicotinic acid hydrazide for several hours. Evaporating the solvent and crystallizing the residue from methanol yields the isonicotinoyl hydrazone of 4'-acetoxy-4-glyoxalyl-diphenylether.

Example 15

A mixture of 18.5 g. of 4-methyldiphenylether, 20 g. of aluminum chloride and 120 cc. of carbon disulfide is reacted with 14.7 g. of dichloroacetyl chloride according to the procedure of Example 11 to give 4'-methyl-4-dichloroacetyl-diphenylether.

This compound (5.0 g.) dissolved in anhydrous methanol is treated with a solution of 4 g. of sodium in 20 cc. of methanol at 45° C. After 12 hours, the mixture is worked up as in Example 9 to give 4'-methyl-4-glyoxalyl-diphenylether hydrate. The glyoxal (2.66 g.) is refluxed for two hours in 75 cc. of ethanol with 1.37 g. of isonicotinic acid hydrazide to yield upon subsequent cooling the isonicotinoyl hydrazone of 4'-methyl-4-glyoxalyl-diphenylether.

Example 16

To a mixture of 19.6 g. of diphenylsulfide, 100 cc. of carbon disulfide and 13.3 g. of aluminum chloride, cooled to 5° C., is added dropwise 14.74 g. of dichloroacetyl chloride, maintaining the temperature at 5–10° C. The mixture is stirred for five hours, then treated with ice water acidified with hydrochlorine acid and extracted with methylene chloride. The extract is washed with water, dried and evaporated. The residue is vacuum distilled to give 4-dichloroacetyl-diphenylsulfide, the fraction distilling at 170–180° C./0.2 mm. This fraction solidifies and after treatment with boiling hexane melts at 67° C.

The 4-dichloroacetyl-diphenylsulfide is dissolved in methanol and treated with sodium according to the procedure of Example 9 to furnish 4-glyoxalyl-diphenylsulfide hydrate, M.P. 53–56° C.

The glyoxal thus prepared (2.6 g.) is refluxed for three hours with 1.37 g. of isonicotinic acid hydrazide in 80 cc. of ethyl alcohol. Cooling separates the isonicotinoyl hydrazone of 4-glyoxalyl-diphenylsulfide, M.P. 177° C.

Example 17

A solution of 14.1 g. of 4,4'-diacetyldiphenylsulfide in 100 cc. of glacial acetic acid is chlorinated with anhydrous chlorine gas as described in Example 9. The thus obtained 4,4'-bis-dichloroacetyl-diphenylsulfide is dissolved in absolute ethanol and treated with a solution of sodium ethylate (1.2 g. of sodium in 0.5 cc. of ethanol) to give 4,4'-bisglyoxalyl-diphenylsulfide hydrate, M.P. 135–136° C.

The bisglyoxal (3.34 g.) is refluxed for four hours with 2.74 g. of isonicotinic acid hydrazide in 100 cc. of ethanol to give 4,4'-bisglyoxalyl-diphenylsulfide bisisonicotinoyl hydrazone.

Example 18

A mixture of 29.1 g. of 4-ethoxydiphenylsulfide, 25 g. of aluminum chloride and 150 cc. of carbon disulfide is treated with 14.7 g. of dichloroacetyl chloride as described in Example 11. The thus prepared 4'-ethoxy-4-dichloroacetyl-diphenylsulfide is dissolved in anhydrous methanol and reacted with metallic potassium as described previously to furnish the 4'-ethoxy-4-glyoxalyl-diphenylsulfide hydrate.

This glyoxal (6.1 g.) in 60 cc. of benzene is heated at reflux for four hours with isonicotinic acid hydrazide (2.7 g.) to yield the isonicotinoyl hydrazone of 4'-ethoxy-4-glyoxalyl diphenylsulfide.

Similarly, by employing the above reaction sequence the following glyoxals are prepared:

4'-methoxy-4-glyoxalyl-diphenylsulfide hydrate
4'-isopropoxy-4-glyoxalyl-diphenylsulfide hydrate
4'-propoxy-4-glyoxalyl-diphenylsulfide hydrate
4'-butoxy-4-glyoxalyl-diphenylsulfide hydrate
4'-tert.butoxy-4-glyoxalyl-diphenylsulfide hydrate which are then converted to the corresponding isonicotinoyl hydrazones.

Example 19

A mixture of 21.5 g. of 4-ethyldiphenylsulfide, 20 g. of aluminum chloride and 120 cc. of carbon disulfide is treated with 14.7 g. of dichloroacetyl chloride. At the end of the reaction, the mixture is poured into acidified ice-water and then extracted with chloroform. The extract is washed, dried and evaporated to give 4'-ethyl-4-dichloroacetyl-diphenylsulfide. The latter compound (5.5 g.) is dissolved in ethanol and treated with sodium ethylate as described in Example 9 to yield 4'-ethyl-4-glyoxalyl-diphenylsulfide hydrate.

The glyoxal (2.96 g.) is reacted as previously described with isonicotinic acid hydrazide to give 4'-ethyl-4-glyoxalyl-diphenylsulfide isonicotinoyl hydrazone.

Similarly, by employing the above reaction sequence the following glyoxals are prepared:

4'-methyl-4-glyoxalyl-diphenylsulfide hydrate
4'-isopropyl-4-glyoxalyl-diphenylsulfide hydrate
4'-propyl-4-glyoxalyl-diphenylsulfide hydrate
4'-butyl-4-glyoxalyl-diphenylsulfide hydrate which are then converted to the corresponding isonicotinoyl hydrazones.

Example 20

A mixture of 23.6 g. of 3-chloro-4-methyldiphenylsulfide, 20 g. of aluminum chloride and 120 cc. of carbon disulfide is treated with 14.7 g. of dichloroacetyl chloride according to the directions of Example 11 to yield 3'-chloro-4'-methyl-4-dichloroacetyl-diphenylsulfide. The latter compound (5.7 g.) in 70 cc. of anhydrous methanol is reacted with a solution of 1 g. of potassium in 20 cc. of methanol as described in Example 9 to give 3'-chloro-4'-methyl-4-glyoxalyl-diphenylsulfide hydrate.

The glyoxal (3.18 g.) is refluxed for six hours with 1.3 g. of isonicotinic acid hydrazide in 80 cc. of tetrahydrofuran. At the end of the reaction, the mixture is cooled and the precipitate filtered which is 3'-chloro-4'-methyl-4-glyoxalyl-diphenylsulfide isonicotinoyl hydrazone.

Similarly, by employing the above reaction sequence the following glyoxals are prepared:

3'-chloro-4'-ethyl-4-glyoxalyl-diphenylsulfide hydrate
3'-chloro-4'-isopropyl-4-glyoxalyl-diphenylsulfide hydrate
3'-chloro-4'-propyl-4-glyoxalyl-diphenylsulfide hydrate
3'-chloro-4'-butyl-4-glyoxalyl-diphenylsulfide hydrate which are then converted to the corresponding isonicotinoyl hydrazones.

Example 21

4-acetyldiphenylsulfoxide (6.2 g.), obtained by the oxidation of the corresponding sulfide with the calculated amount of hydrogen peroxide, is dissolved in 75 cc. of acetic acid and chlorinated as described in Example 9 to give 4-dichloroacetyl-diphenylsulfoxide, M.P. 98° C. This compound (4 g.) is reacted with potassium ethylate as in Example 9 to yield 4-glyoxalyl-diphenylsulfoxide hydrate, M.P. 126–128° C. which is then reacted with isonicotinic acid hydrazide to furnish 4-glyoxalyl-diphenylsulfoxide isonicotinoyl hydrazone.

Example 22

4,4'-diacetyldiphenylsulfoxide (5.6 g.), prepared by the oxidation of the corresponding sulfide with the calculated amount of hydrogen peroxide, is dissolved in 175 cc. of acetic acid, chlorinated and then reacted with sodium methylate as described in Example 9 to yield 4,4'-bisglyoxalyl-diphenylsulfoxide hydrate. This glyoxal (3.2 g.) is refluxed for three hours with 2.74 g. of isonicotinic acid hydrazide in 100 cc. of ethanol to yield the bisisonicotinoyl hydrazone of 4,4'-bisglyoxalyl-diphenylsulfoxide.

Example 23

A mixture of 3.1 g. of selenium dioxide, 2 cc. of water and 8 cc. of dioxane is heated to 70° C. while a solution of 2.4 g. of 4,4'-diacetylbiphenyl in 20 cc. of dioxane is added. The mixture is worked up as in Example 12 to furnish 4,4'-bisglyoxalyl-biphenyl hydrate, M.P. 160–162° C.

This bisglyoxal (2.72 g.) is reacted for four hours with 2.74 g. of isonicotinic acid hydrazide in 100 cc. of ethanol. Cooling yields 4,4'-bisglyoxalyl-biphenyl bisisonicotinoyl hydrazone, M.P. 280° C. (dec.).

Example 24

4-acetyldiphenylsulfone (20 g.), obtained by treating the corresponding sulfide with an excess of hydrogen peroxide in acetic acid and then water to complete the precipitation, is dissolved in glacial acetic acid and chlorinated as in Example 9 to yield 4-dichloroacetyl-diphenylsulfone, M.P. 101–102° C.

The dichloro derivative (4 g.) is treated with sodium methylate as described in Example 9 to give 4-glyoxalyl-diphenylsulfone which is reacted with an equimolecular amount of isonicotinic acid hydrazide to give the corresponding isonicotinoyl hydrazone, M.P. 231–233° C.

Example 25

To a solution of 6.04 g. of 4,4'-diacetyl-diphenylsulfone (obtained from the corresponding sulfide as in Example 24) in 500 cc. of acetic acid is added slowly a solution of 12.8 g. of bromine in 20 cc. of acetic acid, maintaining the temeprature at 30–40° C. The mixture is allowed to stand overnight at room temperature, is then poured into water and the precipitate filtered. This product is dissolved in cold dioxane and water is added to crystallize the pure 4,4'-bis-dibromoacetyl-diphenylsulfone, M.P. 195° C.

The sulfone (5 g.) is treated with sodium methylate as in preceding examples, to give 4,4'-bisglyoxalyl-diphenylsulfone which is reacted with two equivalents of isonicotinic acid hydrazide in 100 cc. of ethanol to yield 4,4'-bis-glyoxalyl-diphenylsulfone bisisonicotinoyl hydrazone.

Example 26

To a mixture of 16.8 g. of diphenylmethane, 20 g. of aluminum chloride and 100 cc. of carbon disulfide is added slowly at room temperature, 7.6 g. of dichloroacetyl chloride. The mixture is worked up as in Example 11 to furnish 4-dichloroacetyl-diphenylmethane, M.P. 113° C.

This compound (4.5 g.) is treated with sodium ethylate to give the corresponding glyoxal which is reacted with an equimolecular amount of isonicotinic acid hydrazide to give 4-glyoxalyl-diphenylmethane isonicotinoyl hydrazone, M.P. 190° C.

Example 27

To a mixture of 8.4 g. of diphenylmethane, 10 g. of aluminum chloride and 50 cc. of carbon disulfide is added at room temperature, 7.6 g. of dichloroacetyl chloride. Operating as in Example 11, there is obtained 4,4'-bis-dichloroacetyl-diphenylmethane, M.P. 112–113° C.

This compound (6 g.) in 100 cc. of ethanol is treated with a solution of 1 g. of metallic sodium in 25 cc. of ethanol. The glyoxal thus obtained (4 g.) is reacted with 3.9 g. of isonicotinic acid hydrazide in boiling benzene to yield the isonicotinoyl hydrazone of 4,4'-bis-glyoxalyl-diphenylmethane.

Example 28

A mixture of 18 g. of stilbene, 20 g. of aluminum chloride, 15.1 g. of dichloroacetyl chloride and 100 cc. of carbon disulfide is reacted as described in Example 11 to give 4-dichloroacetylstilbene, M.P. 154.5–155.5° C.

This compound (10 g.) is treated with sodium methylate as in preceding examples to yield 4-glyoxalyl-stilbene hydrate, M.P. 144–145° C. which is reacted with isonicotinic acid hydrazide to give the corresponding isonicotinoyl hydrazone.

Example 29

A mixture of 26.4 g. of 4,4'-diacetylstilbene, 30 g. of selenium dioxide, 6 cc. of water and 100 cc. of dioxane is reacted as in Example 12 to yield 4,4'-bisglyoxalylstilbene, M.P. 202° C. (dec.).

Treatment of this bisglyoxal with isonicotinic acid hydrazide furnishes the corresponding bisisonicotinoyl hydrazone.

Example 30

A mixture of 13.3 g. of 4,4'-diacetyl-diphenylethane and 200 cc. of glacial acetic acid is chlorinated as in Example 9 to yield 4,4'-bis-dichloroacetyl-diphenylethane, M.P. 153–154° C. This intermediate is treated with sodium methylate to give 4,4'-bisglyoxalyl-diphenylethane hydrate, M.P. 147–149° C., which is reacted with isonicotinic acid hydrazide to furnish the corresponding bisisonicotinoyl hydrazone.

Example 31

Dichloroacetyl chloride (7.5 g.), 9.1 g. of diphenylethane and 10 g. of aluminum chloride in 50 cc. of carbon disulfide are reacted as in Example 11. The reaction mixture is distilled under vacuum and the 4-dichloroacetyl-diphenylethane collected as the fraction boiling at 150–153° C./0.2 mm. which solidifies upon cooling, M.P. 51–52° C. From this intermediate is obtained 4-glyoxalyl-diphenylethane hydrate (M.P. 97–98° C.) by treatment with sodium ethylate. This glyoxal is then reacted with isonicotinic acid hydrazide to give 4-glyoxalyl-diphenylethane isonicotinoyl hydrazone, M.P. 198–199° C.

This application is a continuation-in-part of application Serial No. 841,466 filed September 22, 1959, now abandoned.

What is claimed is:

1. A chemical compound selected from the group consisting of compounds having the following formulas:

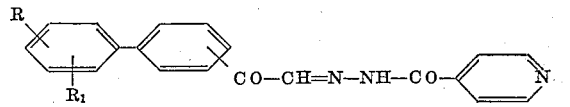

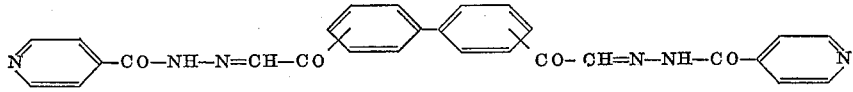

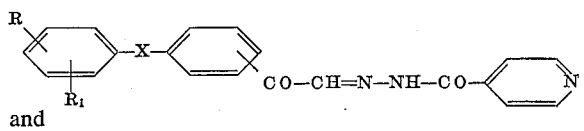

and

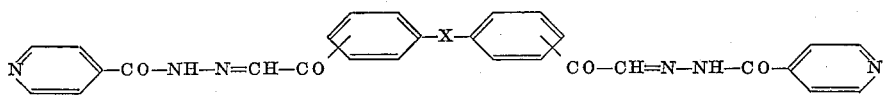

in which R is a mmeber selected from the group consisting of hydrogen, lower alkyl of from 1 to 4 carbon atoms, hydroxy, acetoxy and lower alkoxy of from 1 to 4 carbon atoms; $R_1$ is a member selected from the group consisting of hydrogen and halogen of atomic weight less than 80; and X is a member selected from the group consisting of oxygen, sulfur, sulfinyl, sulfonyl, methylene, ethylene and vinylene.

2. Biphenylyl-4-glyoxal isonicotinoyl hydrazone.
3. 4,4'-bisglyoxalyl-biphenyl bisisonicotinoyl hydrazone.
4. A chemical compound having the formula:

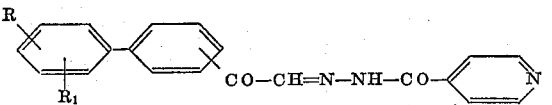

in which R is lower alkyl of from 1 to 4 carbon atoms and $R_1$ is chlorine.

5. 3'-chloro-4'-methyl-biphenylyl-4-glyoxal isonicotinoyl hydrazone.
6. 4-phenoxyphenylglyoxal isonicotinoyl hydrazone.
7. 4,4'-bisglyoxalyl-diphenylether bisisonicotinoyl hydrazone.
8. 4-glyoxalyl-diphenylsulfide isonicotinoyl hydrazone.
9. 4,4'bisglyoxalyl-diphenylsulfide bisisonicotinoyl hydrazone.

No references cited.